United States Patent
Isella

(10) Patent No.: US 8,114,198 B2
(45) Date of Patent: Feb. 14, 2012

(54) CROSS SHIP ARCHITECTURE FOR DISPATCH CRITICAL FUEL TANK INERTING SYSTEM

(75) Inventor: Giorgio Isella, Culver City, CA (US)

(73) Assignee: Honeywell International, Inc., Morristown, NJ (US)

( * ) Notice: Subject to any disclaimer, the term of this patent is extended or adjusted under 35 U.S.C. 154(b) by 493 days.

(21) Appl. No.: 12/353,513

(22) Filed: Jan. 14, 2009

(65) Prior Publication Data

US 2010/0176245 A1 Jul. 15, 2010

(51) Int. Cl.
*B64D 37/32* (2006.01)
(52) U.S. Cl. ............... 96/4; 96/399; 55/418; 244/135 R
(58) Field of Classification Search .............. 95/47, 54, 95/130; 96/4, 108, 399; 55/418, 467; 244/135 R
See application file for complete search history.

(56) References Cited

U.S. PATENT DOCUMENTS

| | | | |
|---|---|---|---|
| 6,547,188 B2 | 4/2003 | Schmutz | |
| 6,830,219 B1 | 12/2004 | Picot | |
| 6,904,930 B2 | 6/2005 | Susko | |
| 7,048,231 B2 | 5/2006 | Jones | |
| 7,204,868 B2 | 4/2007 | Snow, Jr. | |
| 7,306,644 B2 | 12/2007 | Leigh | |
| 7,608,131 B2 * | 10/2009 | Jensen | 95/11 |
| 7,625,434 B2 * | 12/2009 | Tom et al. | 96/4 |
| 2008/0017248 A1 | 1/2008 | Massey | |
| 2008/0128048 A1 | 6/2008 | Johnson | |
| 2008/0187785 A1 | 8/2008 | Kwok | |
| 2010/0175900 A1 * | 7/2010 | DeFrancesco et al. | 169/62 |

* cited by examiner

*Primary Examiner* — Frank Lawrence, Jr.
(74) *Attorney, Agent, or Firm* — Robert Desmond, Esq.

(57) ABSTRACT

A fuel tank inerting system uses two "half systems" for providing inerting gas for the fuel tanks. Each inerting system may be composed of a temperature control and air pressurization unit (TCPU) and an air separation unit (ASU). A cross-ship duct and valve allows using one TCPU (sized for about half capacity or more, but less than full system capacity) connected to two ASUs. The inerting system may provide for redundancy in the TCPU section.

12 Claims, 5 Drawing Sheets

CROSS SHIP ARCHITECTURE FOR DISPATCH CRITICAL FUEL TANK INERTING SYSTEM

BACKGROUND OF THE INVENTION

The present invention relates to a fuel tank inerting system and, more particularly, a dispatch critical fuel tank inerting system that would allow for a reduction in the inspection burden imposed by the flammability reduction regulations and possibly allow for a lighter design for some of the electrical and mechanical components that reside in the fuel tanks of commercial aircraft.

Fuel tanks of an aircraft represent vulnerable areas on all aircraft for the potential for flame initiation due to the existence of fuel vapor and oxygen concentration levels therein. Fuel tank inerting systems are currently used to reduce oxygen concentration levels within fuel tanks of some military aircraft in order to significantly reduce the vulnerability of military aircraft to hostile munitions.

As is known in the art, as oxygen concentration levels within a fuel tank increase, likelihood of flame initiation and propagation and likelihood of a possible explosion also increases. This threat exists since fuel vapors generally mix with ambient air that has a 21% concentration of oxygen.

Some aircraft, principally military aircraft, are equipped with fuel tank inerting systems, which supply nitrogen gas to purge fuel tanks and effectively reduce oxygen concentration levels therein. Of available types of fuel tank inerting systems, the most desirable from a weight, capacity, and ground service requirements stand point is an inert gas generation system that utilizes pressurized air supplied by engine bleed from a gas turbine engine or other airborne source of pressurized air. This air is separated into an oxygen rich component, which is exhausted overboard, and an oxygen depleted or inert gas component, which is fed to the fuel tank.

In commercial aircraft ignition applications, other requirements, such as reliability, maintenance and cost of internal components and systems can be more stringent. Military inerting systems often utilize complicated and less reliable components to provide nitrogen-enriched air to each fuel tank, for all perceivable mission conditions. During combat military missions, threats from hostile munitions are highly probable. The military type systems have a poor reliability history, with high maintenance costs and are oversized for the vast majority of typical commercial aircraft operations.

The primary source of flammability exposure for current commercial aircraft is in the center fuel tanks, particularly if located adjacent to heat sources. Thus, a primary desire exists in commercial aircraft applications to reduce flammability exposure in center fuel tanks, to a level that is similar to that of the wing fuel tanks. Additionally, reducing exposure in wing fuel tanks can also be desirable when aircraft design characteristics result in high flammability exposure or when additional reduction in wing fuel tank flammability exposure is desired.

Additionally, it is also desirable for the fuel tank to be inert during both ground and flight conditions. Further, variations in oxygen concentrations throughout tanks must be minimized to achieve a uniform level of inert content, without over sizing the inerting system.

Current inerting systems provide fuel tank safety enhancement and are typically not dispatch critical. Referring to FIG. 1, the fuel tank inerting system 100 comprises a single thermal control unit 102 feeding a single bank 104 of three air separation modules 106. The thermal control unit 102 controls the temperature of an inlet flow 108 to the air separation module 106 to a fixed temperature and regulates the pressure in climb and cruise to a maximum of 45±6 psig. During most of the cruise segment, the bleed pressure is well below the regulation set point so the system 100 operates with the regulator 110 fully open. During the descent phase, the system 100 obtains a boost in the purity of the nitrogen enriched air provided to the fuel tank by compressing the inlet flow. At the top of descent, a turbo compressor shut-off valve 112 is opened and bleed air is supplied to a drive turbine 114 of a turbo compressor 118 so that the compressor 116 boosts the pressure available from the aircraft bleed system.

This conventional system 100 is sized to provide the flow and level of nitrogen enrichment that is high enough during all flight segments so that the fleet flammability exposure of the center wing tank is less than 3% of the operational time. To ensure that the center wing tank is protected from possible latent ignition sources during the flights conducted with the system inoperable (INOP), the operator is required to conduct regular inspections of the pumps and wiring within the tank.

The components that drive the INOP rate of the system 100 are the system shut-off and temperature control valves and, to a lesser extent, the turbo compressor and its shut-off valve. The nitrogen separation performance of the air separation module is monitored on every flight using the oxygen sensor and will be maintained on a hard-timed removal schedule; it is not expected to be a significant contributor to dispatch failures.

As can be seen, there is a need for a fuel tank inerting system that may meet the challenges imposed by the redundancy and reliability needed for a dispatch critical system that complies with commercial transport operational interrupt requirements.

SUMMARY OF THE INVENTION

In one aspect of the present invention, a fuel tank inerting system comprises a first temperature control and air pressurization unit (TCPU); a first air separation unit (ASU) having a first fluid connection for fluidly connecting the first TCPU with the first ASU; a second TCPU; a second ASU having a second fluid connection for fluidly connecting the second TCPU with the second ASU; and a cross ship valve isolating flow between the first fluid connection and the second fluid connection.

In another aspect of the present invention, a fuel tank inerting system comprises a first temperature control and air pressurization unit (TCPU); a first air separation unit (ASU) having a first fluid connection for fluidly connecting the first TCPU with the first ASU; a first flow orifice restricting the flow of air exiting from the first ASU; a second TCPU; a second ASU having a second fluid connection for fluidly connecting the second TCPU with the second ASU; a second flow orifice restricting the flow of air exiting from the second ASU; and a cross ship valve isolating flow between the first fluid connection and the second fluid connection, wherein the first TCPU and the second TCPU are sized to provide at least half of the inerting system's temperature controlled pressurized air requirements, but less than the full amount of the inerting system's temperature controlled pressurized air requirements, and wherein the first and second flow orifices are selectable to provide one of a high flow therethrough and a low flow therethrough.

In a further aspect of the present invention, a method for inerting a fuel tank comprises passing engine bleed air through a first temperature control and air pressurization unit (TCPU); opening a cross ship valve to permit passing the output from the first TCPU into a first and a second air separation unit (ASU); and inerting the fuel tank with nitrogen enriched air from the first and second ASUs.

These and other features, aspects and advantages of the present invention will become better understood with reference to the following drawings, description and claims.

DETAILED DESCRIPTION OF THE INVENTION

The following detailed description addresses the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention provide a fuel tank inerting system by using two "half systems" for providing inerting gas for the fuel tanks. Each inerting system may be composed of a temperature control and air pressurization unit (TCPU) and an air separation unit (ASU). Embodiments of the present invention may use a cross-ship duct and valve to allow using one TCPU (sized for about half capacity or more, but less than full system capacity) connected to two ASUs. The inerting system according to embodiments of the present invention may include, as discussed below, redundancy in the TCPU section. Two "half size" TCPUs, sized for about half capacity or more, but less than full system capacity, may be used in embodiments of the present invention to provide temperature and pressure control for two (or more) ASUs. The TCPUs may also be cross-linked such that one of the two TCPUs may be used to provide temperature and pressure control to two (or more) ASUs should one TCPU fail. In this mode (where one of the TCPUs fail), one TCPU may be providing temperature and pressure control to two (or more) ASUs, resulting in a lower flow, but a higher quality nitrogen (higher percentage nitrogen enrichment).

Since the ASUs are expected to have much higher reliability than the TCPUs, the possibility of operating both ASUs from one TCPU pack may provide an increase in overall dispatch reliability as the TCPU becomes substantially a fully redundant system. The fact that the TCPU may only be "half size" may be compensated by operational measures (such as longer/higher pressure operation in cruise and/or limited ground operation) that are tolerable for normal operation.

Figure 1:
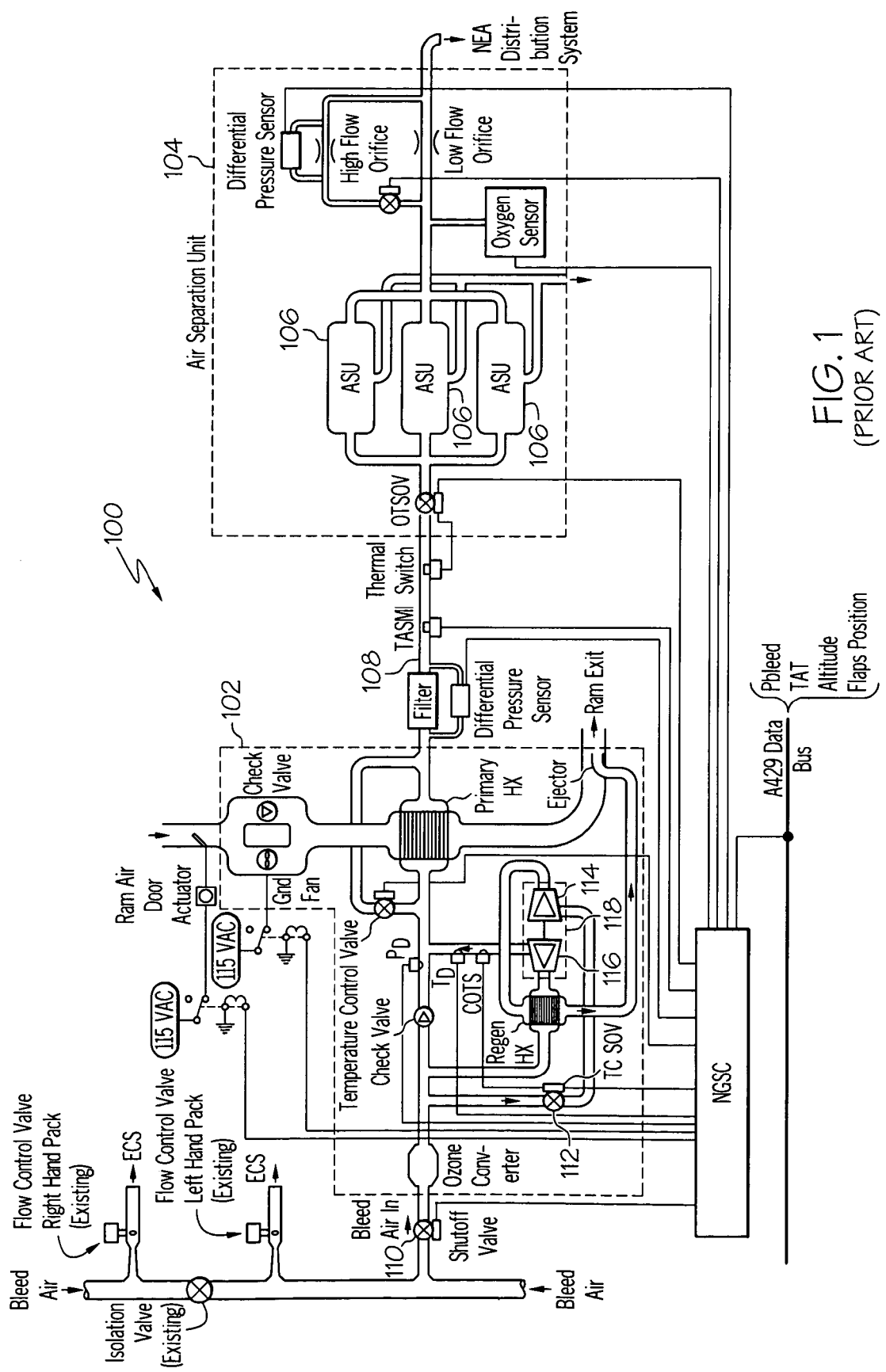
FIG. 1 is a schematic drawing showing a fuel tank inerting system of the prior art.
Figure 2:
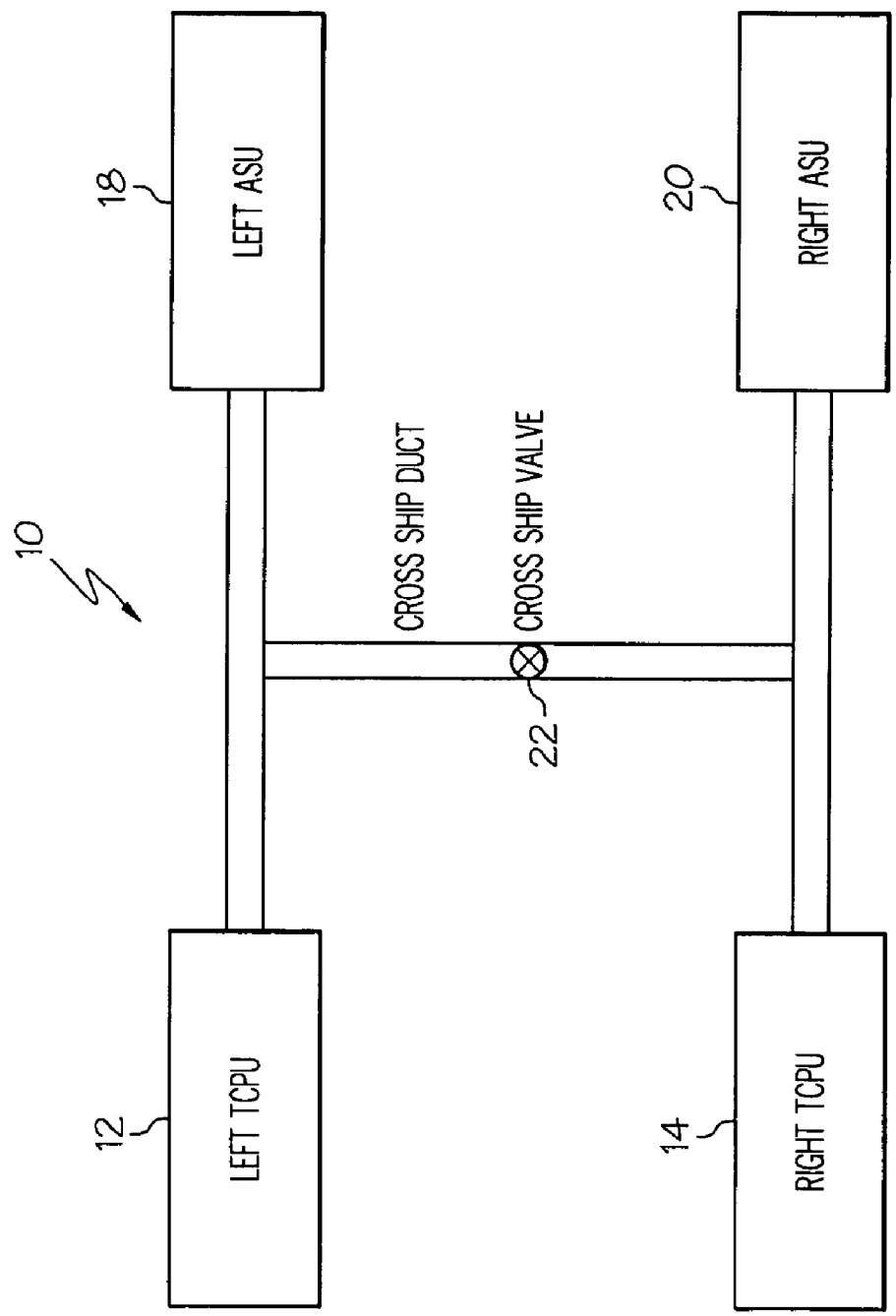
FIG. 2 is a schematic drawing of a two-pack fuel inerting system according to an embodiment of the present invention.

Referring to FIG. 2, there is shown a schematic drawing of a two-pack fuel inerting system 10 according to an embodiment of the present invention. In this schematic drawing, a left TCPU 12 and a right TCPU 14 may operate to provide temperature and pressure controlled air to a left ASU 18 and a right ASU 20, respectively. In the event of a failure, as described in more detail below, in one of the TCPUs 12, 14, the faulted system may be shut down and a cross ship valve 22 may be opened. The non-faulted system may then supply temperature and pressure controlled air to both the right ASU 20 and the left ASU 18. Typically, the left TCPU 12 and the right TCPU 14 may be sized for about half capacity or more, but less than full system capacity, as compared to conventional TCPUs.

Figure 3A:
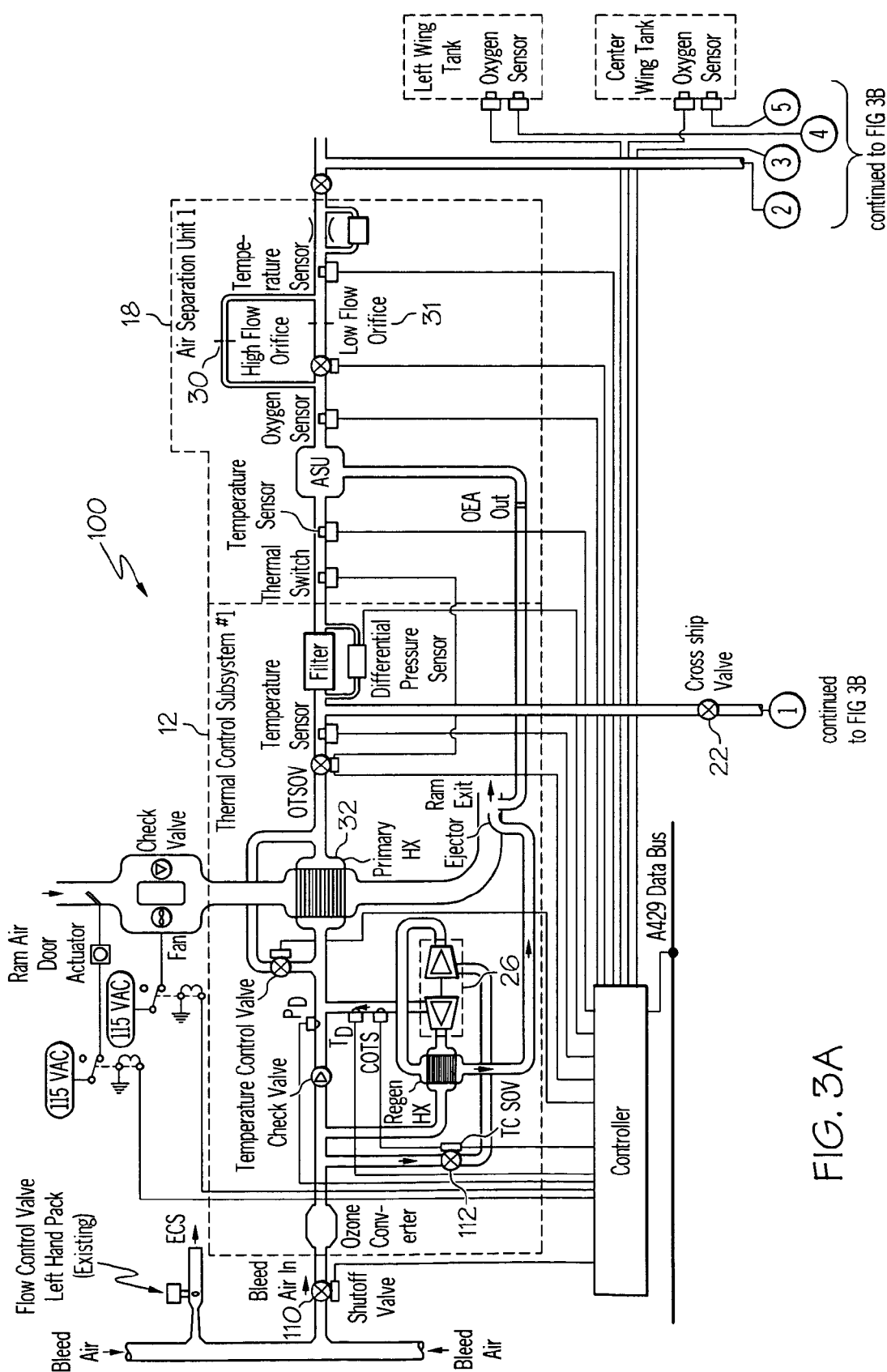
FIGS. 3A and 3B are detailed schematic drawings of the two-pack fuel inerting system of FIG. 2.
Figure 3B:
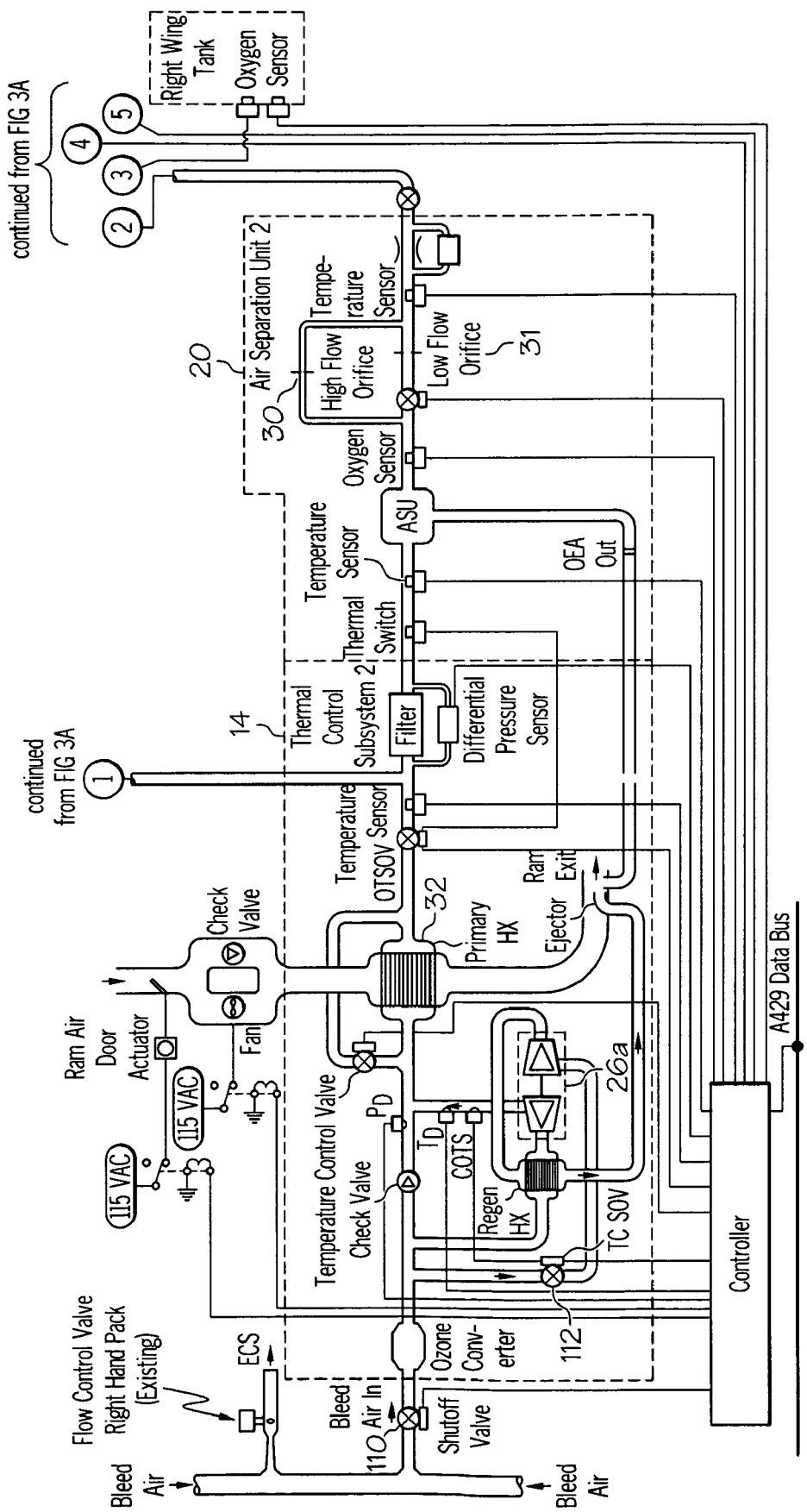

Referring now to FIGS. 3A and 3B, there are shown detailed schematic drawings of the two-pack fuel inerting system 10 of FIG. 2. The inerting system 10 may have an architecture that may allow for a fault accommodation. In the event of a failure of one of the valves (such as valve 24) or of the turbocompressor 26, the faulted system (in this example, TCPU 12) may be shut down and the cross ship valve 22 may be opened. The remaining TCPU 14 may then supply temperature and pressure controlled air to both ASUs 18, 20.

With the failure condition described in the paragraph above, with TCPU 12 being inoperable, in the climb and cruise segments, bleed air 28 from one engine (not shown) may be cooled and supplied to the two ASUs 18, 20 by the remaining TCPU (in this example, TCPU 14) at close to the same pressure as in normal operation. The flow rate of nitrogen enriched air to the tanks (not shown) may also be close to normal.

In the descent phase, when the remaining turbocompressor 26a is operating, it may be desirable to obtain the nitrogen separation advantage gained by supplying flow to both ASUs 18, 20, albeit at a reduced pressure and flow volume. In normal operation (with both TCPUs 12, 14 operational), the compressor flow rate capacity may be sized to match the combined flow area of low 30 and high 31 flow orifices located at the discharge of the ASUs 18, 20. The cooling capacity of a primary heat exchanger 32 may be sized to cool this flow rate at the hot day approach condition. During a fault condition (for example, TCPU 12 is inoperable), the flow orifice 30 may be sized to allow only low flow through both ASUs 18, 20. Therefore, while a lower flow is produced, by using both ASUs 18, 20, a greater enrichment of nitrogen may be achieved.

A number of alternative descent phase fault accommodation schemes could be implemented. For example and as mentioned above, given an adequate surge margin, the remaining compressor (when one is in fault) could supply both air separation modules (ASUs 18, 20) operating on the low flow orifices, which may maintain a high purity of the nitrogen enriched air. With the reduced area of the flow restriction by the low flow orifice, the compressor may speed up and gain pressure ratio and the higher delivery pressure may enhance membrane performance and partially compensate for the loss in mass flow.

As a second alternative, given adequate flow margin, the remaining compressor could supply the first ASU 18 operating on the high and low flow orifices and the second module operating on only the low flow orifice. With the higher area of the flow restriction, the compressor may slow down and loose pressure ratio, which may detract from membrane performance but result in a greater mass flow as compared to the alternative in the previous paragraph.

As a third alternative, the cross ship valve may be closed and the system may revert to half flow capability in descent.

In the above discussion, the high and low flow orifices describe flow through the orifices 30 relative to each other and is not meant to describe any particular flow rate. For example, the high flow orifice may permit an air flow from about 6 to about 15 pounds per minute (lb/min), wherein the low flow orifice may permit an air flow from about 1.5 to about 5 lb/min.

For the one exemplary TCPU out condition, if the oxygen level were above 12% after landing, this shortfall in inerting performance could potentially be compensated for by continuing to operate the remaining system on the ground in any of the above alternative configurations. For example, using the compressor to supply both ASUs 18, 20 operating on the low flow orifices, the system 10 could deliver nitrogen enriched air to the fuel tanks and pull down the oxygen concentration by as much as 1 percent per minute.

In another embodiment of the present invention, the fault accommodation capability of the inerting system may be made more robust if the oxygen levels within the fuel tanks were monitored. In the ground operation scenario, for example, the system could be alerted of an oxygen level greater than 12% and then alerted again when the oxygen level was satisfactory for shutdown.

Figure 4:
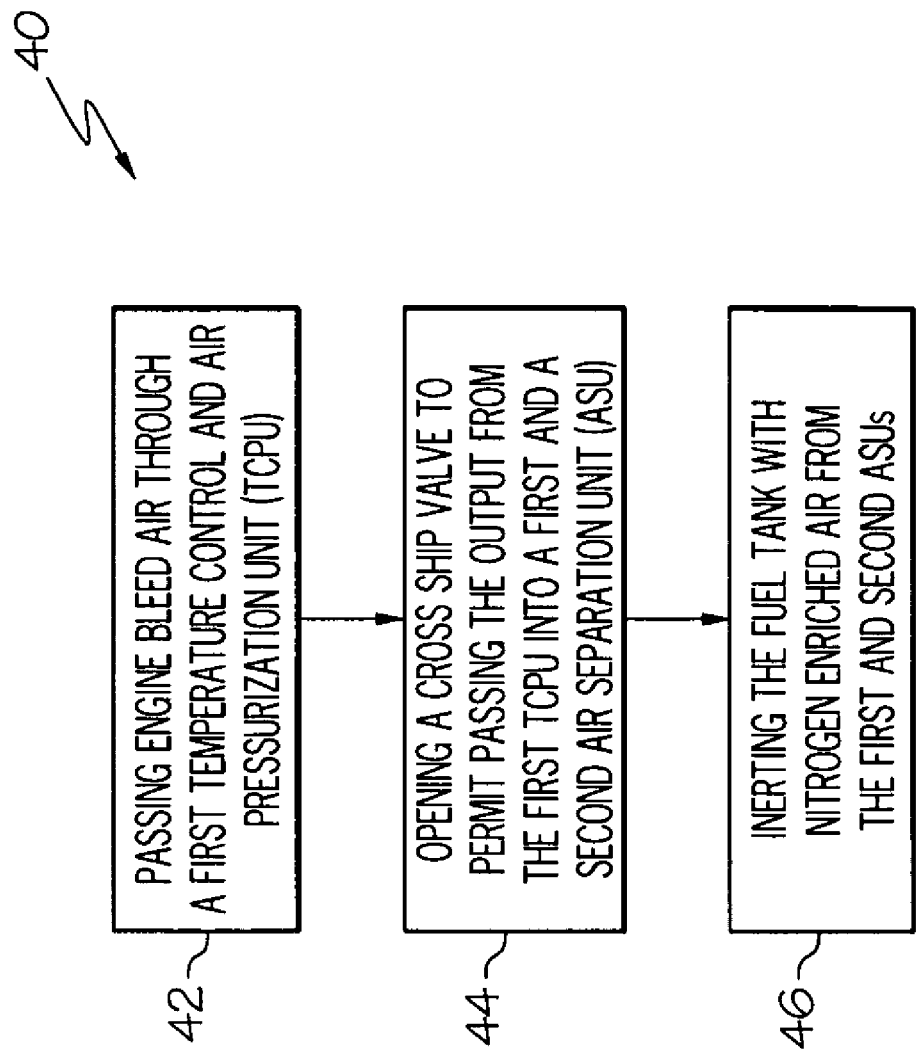
FIG. 4 is a flow chart describing a method according to the present invention.

Referring now to FIG. 4, there is shown a flow chart describing a method 40 for inerting a fuel tank, according to an embodiment of the present invention. The method 40 may include a step 42 of passing engine bleed air through a first temperature control and air pressurization unit (TCPU), a step 44 of opening a cross ship valve to permit passing the output from the first TCPU into a first and a second air separation unit (ASU), and a step 46 of inerting the fuel tank with nitrogen enriched air from the first and second ASUs. In this method 40, the first TCPU may be in flow communication with the first ASU and a second TCPU may be in flow communication with the second ASU when the cross ship valve is closed. The method 40 may be useful in climb and cruise operation wherein one TCPU may be used to provide temperature and pressure controlled air to more than one ASU. The method 40 may also be useful should one of the TCPUs fail.

While the above description describes the use of two TCPUs to control two ASUs, the invention should not be limited to such a specific embodiment. For example, multiple TCPUs (three or more) may be used to supply temperature and pressure controlled air to multiple ASUs. Moreover, each ASU may contain one or more air separation modules (ASM).

It should be understood, of course, that the foregoing relates to exemplary embodiments of the invention and that modifications may be made without departing from the spirit and scope of the invention as set forth in the following claims.

I claim:

1. A fuel tank inerting system comprising:
a first temperature control and air pressurization unit (TCPU);
a first air separation unit (ASU) having a first fluid connection for fluidly connecting the first TCPU with the first ASU;
a second TCPU;
a second ASU having a second fluid connection for fluidly connecting the second TCPU with the second ASU; and
a cross ship valve isolating flow between the first fluid connection and the second fluid connection.

2. The fuel tank inerting system of claim 1, wherein the first TCPU and the second TCPU are sized to provide at least half of the inerting system's temperature controlled pressurized air requirements, but less than the full amount of the inerting system's temperature controlled pressurized air requirements.

3. The fuel tank inerting system of claim 1, further comprising:

high and low flow orifices restricting flow from the first ASU; and
high and low flow orifices restricting flow from the second ASU, wherein the high and low flow orifices are selectable to provide one of a high flow therethrough and a low flow therethrough.

4. The fuel tank inerting system of claim 3, wherein the first TCPU provides air to the first ASU and the second ASU.

5. The fuel tank inerting system of claim 4, wherein the high and low flow orifices are selected so as to provide the low flow therethrough.

6. The fuel tank inerting system of claim 5, wherein nitrogen enrichment of air exiting the first and second ASUs has a greater nitrogen concentration as compared to an operating condition when both the first and second flow orifices permit the high flow therethrough.

7. The fuel tank inerting system of claim 3, wherein the first TCPU provides air to the first ASU and the second TCPU provides air to the second ASU.

8. The fuel tank inerting system of claim 1, wherein engine bleed air provides an air feed to the first TCPU and the second TCPU.

9. The fuel tank inerting system of claim 1, wherein the first TCPU and the second TCPU each include a turbocompressor providing pressurization of the air to be delivered to the first ASU and the second ASU.

10. A fuel tank inerting system comprising:
a first temperature control and air pressurization unit (TCPU);
a first air separation unit (ASU) having a first fluid connection for fluidly connecting the first TCPU with the first ASU;
high and low flow orifices restricting a flow of gas exiting from the first ASU;
a second TCPU;
a second ASU having a second fluid connection for fluidly connecting the second TCPU with the second ASU;
high and low flow orifices restricting a flow of gas exiting from the second ASU; and
a cross ship valve isolating flow between the first fluid connection and the second fluid connection, wherein
the first TCPU and the second TCPU are sized to provide at least half of the inerting system's temperature controlled pressurized air requirements, but less than the full amount of the inerting system's temperature controlled pressurized air requirements, and wherein the high and low flow orifices are selectable to provide one of a high flow and a low flow through each of the first and second ASU.

11. The fuel tank inerting system of claim 10, wherein:
the first TCPU provides air to the first ASU and the second ASU;
the low flow orifice in the first ASU and the low flow orifice in the second ASU both provide the low flow therethrough; and
nitrogen enrichment of the air exiting the first and second ASUs has a greater nitrogen concentration as compared to an operating condition when both the high flow orifices permit the high flow therethrough.

12. The fuel tank inerting system of claim 10, wherein:
the first TCPU provides air to the first ASU and the second TCPU provides air to the second ASU; and
the high flow orifices both provide the high flow therethrough.

* * * * *